United States Patent [19]
Bronstert et al.

[11] Patent Number: 4,835,221

[45] Date of Patent: May 30, 1989

[54] SALTS OF POLYVALENT CATIONS OF POLYMERS OF CONJUGATED DIENES

[75] Inventors: Klaus Bronstert, Carlsberg; Wolfgang F. Mueller, Neustadt, both of Fed. Rep. of Germany

[73] Assignee: BASF Aktiengesellschaft, Ludwigshafen, Fed. Rep. of Germany

[21] Appl. No.: 920,078

[22] Filed: Oct. 17, 1986

[30] Foreign Application Priority Data

Oct. 24, 1985 [DE] Fed. Rep. of Germany ....... 3537770

[51] Int. Cl.$^4$ ................................................ C08F 8/42
[52] U.S. Cl. ............................. 525/332.8; 525/332.9; 525/333.1; 525/333.2; 525/370; 525/371; 525/372; 525/373
[58] Field of Search ............... 525/332.8, 332.9, 333.1, 525/333.2

[56] References Cited

U.S. PATENT DOCUMENTS 4,104,330 8/1978 Danzig et al. .................. 260/880 B
4,465,809 8/1984 Smith ............................. 525/332.9

FOREIGN PATENT DOCUMENTS 56-118405 9/1981 Japan .

*Primary Examiner*—Joseph L. Schofer
*Assistant Examiner*—Bernard Lipman
*Attorney, Agent, or Firm*—Keil & Weinkauf

[57] ABSTRACT

Polymers and copolymers of conjugated dienes and aromatic vinyl compound which have a carboxyl end group and are present as salts, the salts containing metal cations or metal cation complexes which are bivalent or polyvallent and also a process for preparing such salts of polymers which contain carboxyl end groups and their use for modifying thermoplastic materials or as vulcanizable materials.

4 Claims, No Drawings

SALTS OF POLYVALENT CATIONS OF POLYMERS OF CONJUGATED DIENES

The present invention relates to rubberlike polymers of conjugated dienes which have carboxyl end groups and are present as salts, the salts containing metal cations or metal cation complexes which carry no fewer than two positive charges. The polymers of the conjugated dienes can be present as homopolymers of the conjugated dienes or as copolymers thereof in which the comonomer is another conjugated diene or an aromatic vinyl compound.

Polymers and copolymers of conjugated dienes and/or aromatic vinyl compounds, for example block polymers of dienes and styrene, which are obtained using a lithiohydrocarbon and have carboxyl end groups are known. German Laid-Open Application DOS No. 2,723,905, for instance, discloses obtaining these compounds by subjecting first styrene and then a styrene/isoprene mixture to polymerization and then reacting the block polymer first with an alkylene oxide, for example ethylene oxide, and subsequently subjecting the reaction product to a further reaction with a cyclic dicarboxylic anhydride of an unsaturated dicarboxylic acid, affording polymers which, in addition to a carboxyl end group, have a reactive, polymerizable double bond at the end of the chain. The polymerizable polymers obtained by this process are mixed with free-radical polymerizable monomers and polymerized in the presence of free-radical producers to form graft copolymers. Said German Laid-Open Application DOS 2,723,905 gives no indication of any further reaction of the carboxyl group at the end of the chain.

Japanese Patent JA No. 56/118,405 discloses reacting a block polymer of a diene (for example butadiene) and an aromatic vinyl compound (for example styrene) with unsaturated dicarboxylic acid or dicarboxylic acid derivative to form a carboxyl-containing block polymer. The block polymer is prepared by anionic solution polymerization of a diene/aromatic vinyl compound mixture using a lithioalkyl as initiator. The isolation of the block polymer is followed in a separate step at high temperatures (190° to 210° C.) in an extruder by the reaction of the block polymer with the unsaturated dicarboxylic acid compound to form a carboxyl-containing block polymer. The carboxyl-containing block polymer is subsequently treated in solution with a monovalent metal compound (for example an alkali metal alcoholate or alkali metal hydroxide) and converted into an ionically crosslinked block polymer. Ionically cross-linked block polymers, compared with uncrosslinked block polymers, have a higher mechanical strength and a lower permanent extensibility. Ionically crosslinked block polymers are used as thermoplastic elastomers if they contain little aromatic vinyl compound or as thermoplastic molding materials if the aromatic vinyl compound content is high.

It is an object of the present invention to improve the mechanical and processing properties of rubberlike polymers based on diene polymers or copolymers with aromatic vinyl compounds. Rubberlike polymers based on diene polymers or copolymers frequently have the disadvantage that they undergo cold flow. Rubberlike polymers therefore become tacky and bake together on prolonged storage. By increasing the molecular weight it is possible to reduce cold flow, but the disadvantage is then that the rubberlike polymers have increasingly poor processing properties.

We have now found that this object is achieved with polymers of conjugated dienes having carboxyl end groups, which are present as salts of the general formula

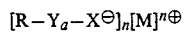

where
M is a metal cation or a metal cation complex and
X is a grouping of the general formula

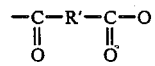

where R' is a divalent organic radical, Y is an alkylene oxide unit and R is a polymer of a conjugated diene, n can be 2, 3, 4, 5, 6, 7, 8, 9 or 10 and a can be 1, 2, 3, 4, 5, 6, 7, 8, 9 or 10.

The present invention further relates to a process for preparing a polymer of a conjugated diene by anionic polymerization thereof, reacting the resulting polymer with an alkylene oxide and a cyclic dicarboxylic anhydride, the reaction product obtained being used together with a metal alcoholate, metal alkyl, metal halide, metal oxide or metal hydroxide, and removing excess dicarboxylic anhydride or masking it by derivatization.

The present invention also relates to the use of such a polymer for modifying thermoplastic materials and to the use as vulcanizable materials.

Further objects of the invention are evident from the following description.

The inventive salts of the polymers of conjugated dienes and of the copolymers of conjugated dienes with one another and/or with aromatic vinyl compounds which have carboxyl end groups have excellent mechanical properties combined with very good processing properties. In particular, the inventive compounds, compared with polymers of the same composition and the same molecular weight, have a much reduced cold flow tendency combined with almost unchanged high fluency.

In the salts of the general formula given above, M is a metal cation or a metal cation complex. The cations and the cation complexes have no fewer than two positive charges. In the formula, the number n can, in addition to 2, be 3 or 4. Preference is given to metal cations, such as $Al^{+++}$, $Mg^{++}$, $Zn^{++}$, $Ni^{++}$, $Zr^{++}$ or $Cd^{++}$. However, it is also possible to use cation complexes, for example those which contain a plurality of metal cations. A suitable structure is for example:

where Me is $Al^{+++}$ or $Cr^{+++}$, r is an integer of from 0 to 20, preferably from 0 to 10, and R" is hydrogen or a short-chain alkyl.

In the general formula, X is a grouping of the general formula

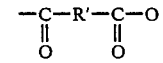

where R' is a divalent organic radical. Such groupings are the result of reacting a diene polymer obtained by anionic polymerization with lithioalkyl catalysis with cyclic dicarboxylic anhydride. Suitable cyclic dicarboxylic anhydrides, which ultimately give the radical of the general grouping, are aliphatic, cycloaliphatic or aromatic dicarboxylic anhydrides. Preference is given to the groupings which are derived from maleic acid, succinic acid, phthalic acid, glutaric acid or 1,8-naphthalenedicarboxylic acid, R' is —CH$_2$—CH$_2$—, —CH=CH—, —CH$_2$—CH$_2$—CH$_2$— or

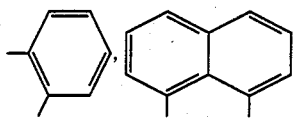

Y is an alkylene oxide grouping. Preference is given to those groupings which are obtained from ethylene oxide, propylene oxide or styrene oxide. However, the invention also encompasses those salts where X is directly connected to R. In the general formula, as stated above, n is 2 or 3, 4, 5, 6, 7, 8, 9 or 10, preferably 3 or 4, and a can be 0 or 1, 2, 3, 4, 5, 6, 7, 8, 9 or 10, preferably 1, 2, 3 or 4.

R is a radical of a conjugated diene polymer obtained by the action of a lithioalkyl on the starting monomers. The conjugated dienes can be polymerized on their own. Examples of conjugated dienes which can be incorporated into the polymers as copolymerized units are butadiene, isoprene or 2,3-dimethylbutadiene. Particular preference is given to butadiene or isoprene.

However, R can also be the radical of a copolymer. Starting materials for this type of polymer are, in addition to the dienes, aromatic monovinyl monomers, such as styrene, styrenes with side chain alkylation, such as α-methylstyrene, and ring-substituted styrenes, such as vinyltoluene or ethylvinylbenzene. The aromatic monovinyl monomers can also be used in mixtures. However, preference is given to styrene on its own.

Random copolymers of dienes and aromatic monovinyl compounds are obtained when mixtures of, for example, styrene and butadiene are polymerized for example in the presence of esters such as tetrahydrofuran. The glass transition point of these polymers is below 0° C., preferably below −15° C. The polymer unit R can also be constituted in such a way that some or all of the olefinic double bonds which stem from the diene units are hydrogenated.

The carboxyl-containing polymer salts according to the invention are used as rubbers or vulcanizable materials. The polymer unit R contains more than 50% by weight, preferably from 70 to 100% by weight, of a copolymerized diene. The remainder to 100% is accounted for by the copolymerized aromatic monovinyl compounds in R.

The polymer radical R has a molecular weight within the range from 5000 to 500,000, preferably within the range from 10,000 to 250,000.

Y is an alkylene oxide unit, preferably based on ethylene oxide, propylene oxide or styrene oxide. a can be 1, 2, 3, 4, 5, 6, 7, 8, 9 or 10, preferably 1, 2, 3 or 4. These alkylene oxide units Y are obtained by reacting the still live polymer from the lithioalkyl polymerization with an alkylene oxide. Preferably the reaction is effected in a ratio of 1 mole of alkylene oxide per mole of the live polymer.

X has the general formula indicated above, and is incorporated by reacting the reaction product of the live polymer based on alkylene oxide with a cyclic dicarboxylic anhydride.

A preferred process for preparing the conjugated diene polymer is the anionic polymerization of the diene and reacting the resulting polymer with an alkylene oxide and then with a cyclic dicarboxylic anhydride. The resulting polymer, which contains carboxyl end groups, is subsequently reacted with a metal alcoholate or with a metal alkyl. This reaction with a metal alcoholate can be effected in such a way that the number of carboxyl-containing polymer radicals m is equal to the number of charges on the metal cation or metal cation complex n. However, it is also possible, as indicated above, to select the ratios in such a way that m is 1, 2, 3, 4, 5, 6, 7, 8, 9 or 10, n being 2, 3 or even 4. The reaction of metal alcoholates with carboxylic acids is known. It is described for example in Kirk-Othmer "Encyclopedia of Chemical Technology", 2nd edition, volume 1, pages 832 to 851.

However, the carboxyl-containing polymer can also be made to react with a metal alkyl, for example triethylaluminum, tritertiarybutylaluminum, diethylzinc and the like. The polyvalent cation can also be added in the form of an oxide or hydroxide, for example as ZnO. To obtain good properties, excess dicarboxylic anhydride must be masked by derivatization or removed, for example by reacting the dicarboxylic anhydride with a metal hydroxide (for example NaOH) to give the corresponding salt or with a metal alcoholate to give the corresponding salt of the half-ester of the dicarboxylic acid. Another possibility is to remove the dicarboxylic anhydride at high temperatures under reduced pressure by means of a high-boiling entrainer.

The novel salts of the carboxyl-containing polymers can be used for modifying thermoplastic materials or as vulcanizable materials.

EXAMPLES (Salts of polyvalent cations of polymers of conjugated dienes)

Preparation of the carboxyl-containing diene polymers

A 5-liter stainless steel standard kettle is charged under nitrogen with purified and dried cyclohexane as solvent, followed by the corresponding amount of destabilized diene or destabilized monomer mixture. Destabilization is obtained by treating butadiene with n-butyllithium and distilling at −5° C.; an isoprene is freed from stabilizer by distillation over a column packed with Al$_2$O$_3$. The reaction mixture is then heated to 40° C., and polymerization is started by adding a calculated amount of initiator (sec.-butyllithium). By maintaining an internal temperature of 65°–70° C., complete polymerization is obtained in 3 hours; the reaction mixture is then cooled down to 40° C., and the alkylene oxide, dissolved in 50 ml of cyclohexane, is added to the live polymer solution in order to convert the carbanion into the corresponding polymeric alcoholate anion; complete conversion requires 1 hour of stirring. The cyclic dicarboxylic anhydride is then added, which is followed by a further hour of stirring at 40° C. to form the polymeric half-ester of the dicarboxylic acid in the form of the lithium salt, with which the polyvalent cation is reacted directly.

The polyvalent cation is dissolved in the form of an alcoholate or metal alkyl in toluene, THF or any other inert hydrocarbon solvent and added to the polymeric half-ester. The molar ratio of polymeric half-ester:cation is from 1:1 to 1:10. The viscosity of the polymer solution immediately increases considerably on addition of the polyvalent cation. To eliminate excess alkyl or alkoxy groups from the cation and to convert the polyvalent cation into the corresponding oxo or hydroxo complex, water can be added in an equimolar amount or in excess to the polymer solution. Before the product is worked up, 0.5% by weight of phenolic stabilizer, based on the polymer, is added. A viscous polymer solution is then precipitated by pouring into isopropanol, and the precipitate is washed twice with isopropanol and dried overnight at 90° C. under nitrogen in a vacuum drying cabinet.

For details of the individual examples, see table below.

Table 1: Synthesis and analysis of the salts of polyvalent cations of polymers of conjugated dienes.

TABLE 1

| Example No. | Cyclohexane [ml] | BuLi [mmol] | Diene Type | Diene [g] | Alkylene oxide Type | Alkylene oxide [mmol] | Anhydride Type | Anhydride [mmol] | Variant | Me compound Type | Me compound [mmol] | VN before addition of cation | VN after addition of cation |
|---|---|---|---|---|---|---|---|---|---|---|---|---|---|
| 1 | 3,000 | 6.3 | Bu | 500 | EO | 12.0 | MA | 12.0 | 3 | Al Isopropylat | 6.0 | 123 | 208 |
| 2 | 3,000 | 8.5 | Bu | 500 | PO | 12.0 | SA | 16.0 | — | Al Isopropylat | 17.0 | 95 | 153 |
| 3 | 3,000 | 10.0 | I | 500 | EO | 20.0 | MA | 20.0 | — | Zn Isopropylat | 20.0 | 84 | 137 |
| 4 | 3,000 | 8.5 | I | 500 | Styrene oxide | 9.0 | SA | 17.0 | — | Zn Isopropylat | 17.0 | 97 | 154 |
| 5 | 3,000 | 7.2 | Bu | 500 | EO | 8.0 | Itaconie anhydride | 15.0 | — | Zn Isopropylat | 15.0 | 108 | 177 |
| 6 | 3,000 | 7.7 | Bu I | 250 250 | EO | 8.5 | SA | 16.0 | — | Zn Isopropylat | 17.0 | 104 | 169 |
| 7 | 3,000 | 7.2 | Bu S | 450 50 | EO | 8.0 | PA | 14.0 | — | Al Isopropylat | 15.0 | 110 | 178 |

BuLi: sec.-butyllithium; Bu: butadiene; I: isoprene; S: styrene; EO: ethylene oxide;
PO: propylene oxide; PA: phthalic anhydride; MA: maleic anhydride; SA: succinic anhydride;
VN: viscosity number measured at 25° C. in toluene (0.5 g of polymer in 120 ml of toluene) in accordance with DIN 51,562

EXAMPLE 8

This Example demonstrates the reduction in cold flow obtained in the case of polybutadiene by the process according to the invention by converting the carboxyl end group into the aluminum salt.

A polymer solution as prepared in Example 2 was divided into 2 portions. Portion 1 is precipitated with isopropanol without pretreatment and worked up to the polymer. Portion 2 is treated before the workup with 9 mmol each of aluminum ethylate. The polymer is molded into balls each of 20 g in weight which are placed on glass plates. The area covered as the balls melt at room temperature is determined as a function of time.

TABLE

| Determination of the cold flow of polybutadiene | | |
|---|---|---|
| VN toluene cold flow after minutes | Starting polymer 95.3 area in cm² | Polymer Al isopropylate 154 area in cm² |
| 0 | 8 | 7.1 |
| 15 | 23.7 | 8.0 |
| 60 | 26.4 | 9.0 |
| 300 | 52.8 | 15.9 |
| 1440 | 69.4 | 28.3 |

TABLE-continued

| Determination of the cold flow of polybutadiene | | |
|---|---|---|
| VN toluene cold flow after minutes | Starting polymer 95.3 area in cm² | Polymer Al isopropylate 154 area in cm² |
| 5760 | 78.5 | 28.5 |

We claim:

1. A polymer of a conjugated diene or copolymer of a conjugated diene and an aromatic vinyl compound having a carboxyl end group, the said polymer or copolymer being present as a salt of the formula $$[R-Y_a-X^\ominus]_n[M]^{n\oplus}$$

where
M is a metal cation or a metal cation complex and
X is a grouping of the formula

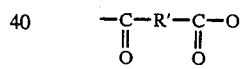

where R' is a divalent organic radical,
Y is an alkylene oxide unit and
R is a polymer of a conjugated diene or a copolymer of a conjugated diene and an aromatic vinyl compound,
n is 2, 3, 4, 5, 6, 7, 8, 9, or 10 and
a is 1, 2, 3, 4, 5, 6, 7, 8, 9 or 10.

2. A polymer as claimed in claim 1, wherein M is $Al^{+++}$, $Mg^{++}$, $Ca^{++}$, $Ba^{++}$, $Sr^{++}$, $Zn^{++}$, $Ni^{++}$, $Zr^{++}$ or $Cd^{++}$.

3. A polymer as defined in claim 1, wherein M is an oxo or hydroxo cation complex of Al, Mg or Zn.

4. A polymer as defined in claim 1, wherein R' is —CH₂—CH₂—, —CH=CH—, —CH₂—CH₂—CH₂—

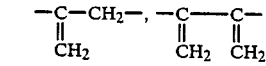

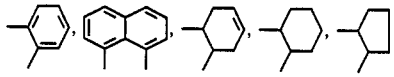

which radicals can in turn be substituted by short alkyl chains ($C_1$-$C_3$) and/or halogen.

* * * * *